Jan. 16, 1951  F. L. SMITH  2,538,131
BEET HARVESTER
Filed June 30, 1949  3 Sheets-Sheet 1
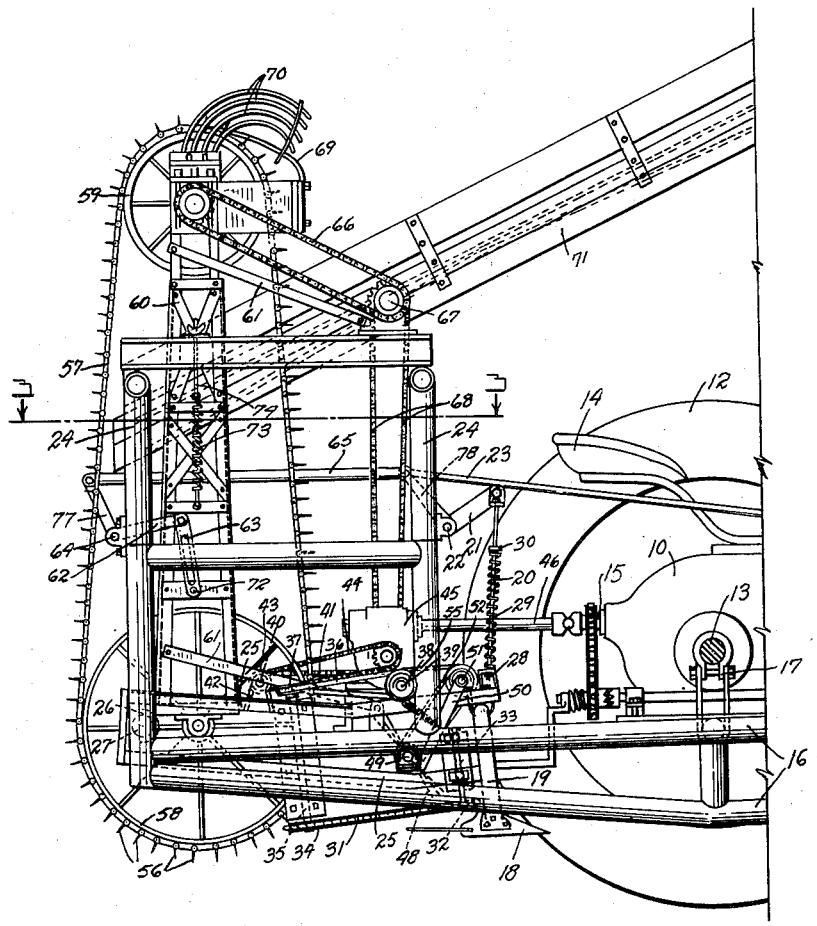
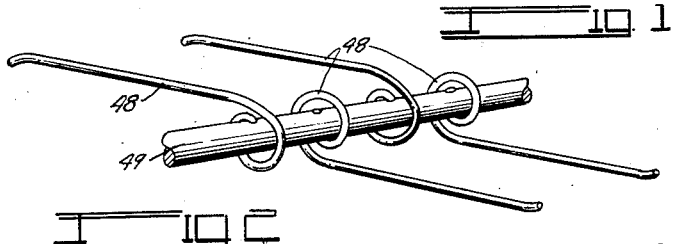
INVENTOR.
FRED L. SMITH
BY
ATTORNEY

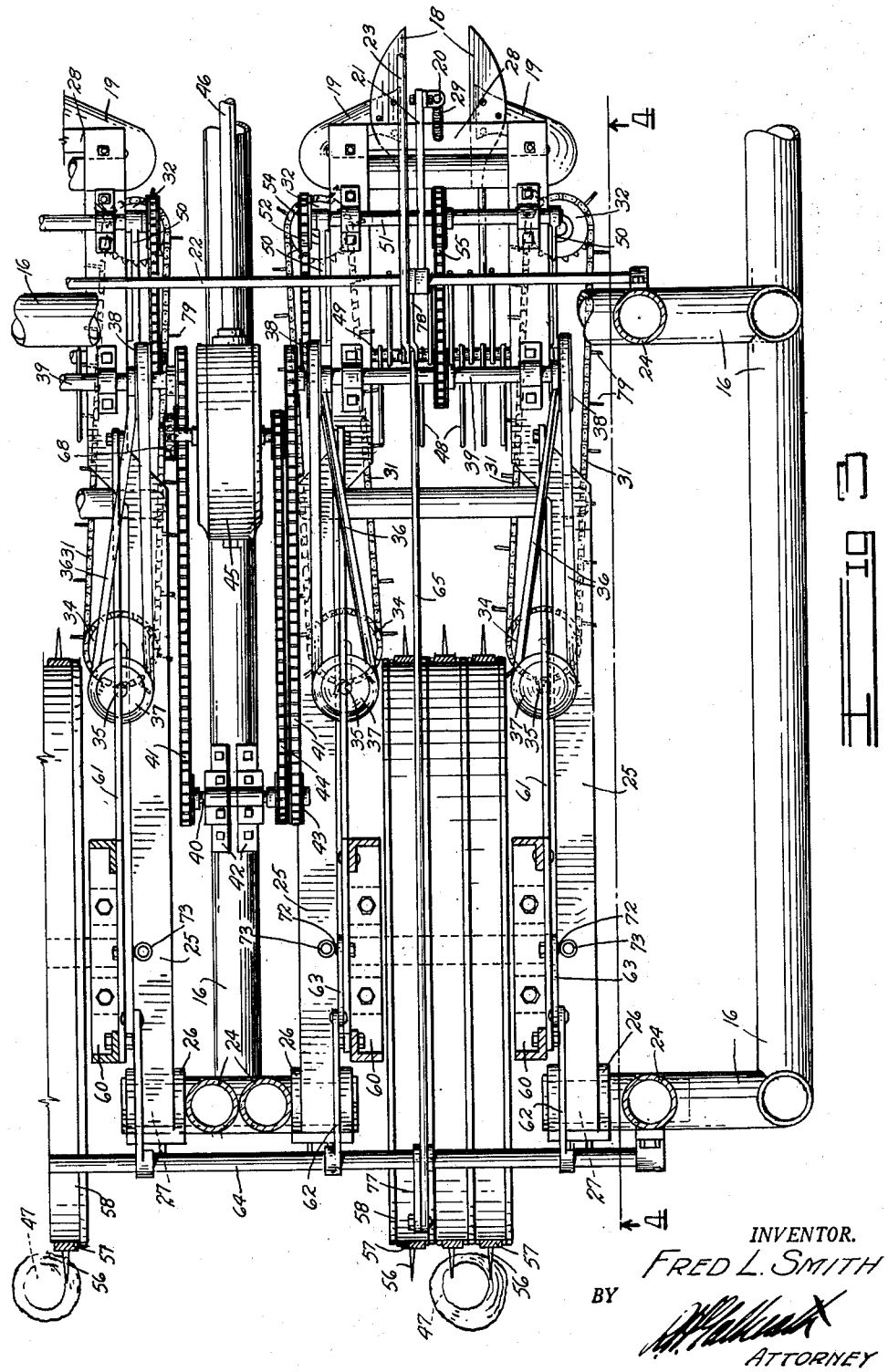

Jan. 16, 1951 F. L. SMITH 2,538,131
BEET HARVESTER
Filed June 30, 1949 3 Sheets-Sheet 3
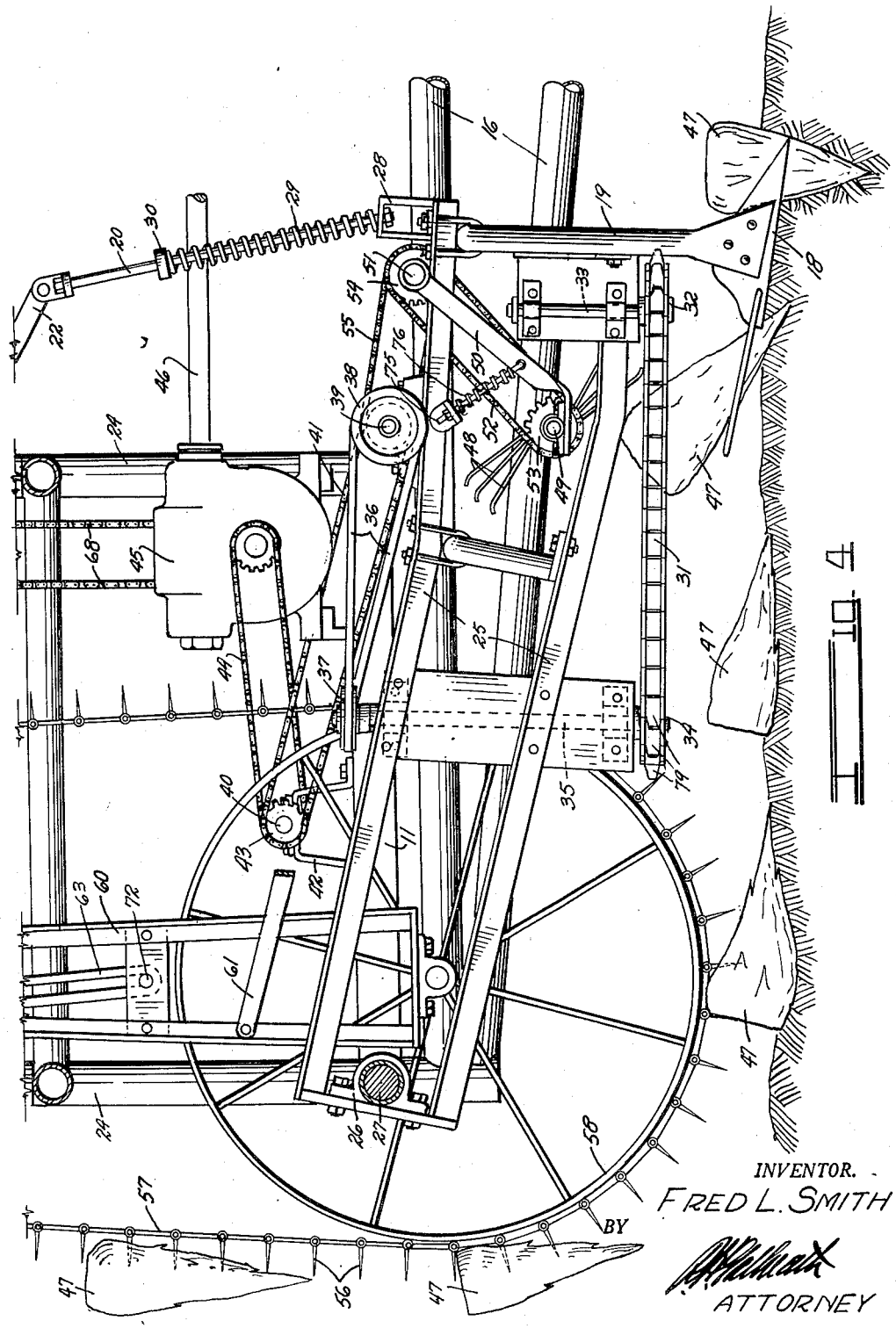
INVENTOR.
FRED L. SMITH
BY
ATTORNEY Patented Jan. 16, 1951

2,538,131

UNITED STATES PATENT OFFICE 2,538,131

BEET HARVESTER

Fred L. Smith, Julesburg, Colo.

Application June 30, 1949, Serial No. 102,359

2 Claims. (Cl. 55—108)

This invention relates to a beet harvester, more particularly to a beet harvesting machine of the type shown in applicant's co-pending application, Serial No. 677,013, filed February 15, 1946, now Patent Number 2,478,877, of which this application is a continuation-in-part.

The principal object of this invention is to provide a highly efficient means for pulling, gathering, and picking up the beets after they have been topped in the ground by means of the harvester illustrated in the said co-pending application.

The surface portion of a beet is tougher and more dense than the inside pulp thereof. Therefore, after the crowns have been removed by the topping mechanism, it is not practical to impale the beets, for lifting purposes, through the relatively soft tops left by the removed crowns. A further object of this invention is to provide means which will place the beets on their sides in alignment with the impaling mechanism so that the beets will be impaled through the tougher and more dense side surfaces thereof.

Another object of the invention is to provide a mechanism which will automatically position the dug beets with their upper extremities facing the pick-up mechanism in order that they may be efficiently impaled and picked up by a traveling spiked medium, and so that they will be properly balanced and positioned on the latter.

Other objects and advantages reside in the detail construction of the invention, which is designed for simplicity, economy, and efficieency. These will become more apparent from the following description.

In the following detailed description of the invention, reference is had to the accompanying drawings which form a part hereof. Like numerals refer to like parts in all views of the drawings and throughout the description.

In the drawings:

Fig. 1 is a side view of the aligning and gathering portion of a beet harvester of the type illustrated in the said co-pending application, with the near tractor wheel removed;

Fig. 2 is a detail view of a reel or sweep mechanism employed in the improved harvester;

Fig. 3 is a fragmentary, enlarged, horizontal section, taken on the line 3—3, Fig. 1; and Fig. 4 is a similarly enlarged vertical section, taken on the line 4—4, Fig. 3.

The improved harvester is designed for attachment to a conventional farm tractor, and, as illustrated, is designed to simultaneously harvest two rows of beets. In the drawing typical parts of a conventional tractor are indicated by numeral as follows: tractor chassis 10, rear drive wheels 12, rear axle housing 13, seat 14, and power-takeoff shaft 15.

The improved harvester is supported on a main frame 16 preferably, but not necessarily, formed of pipe or tubing. The main frame extends along both sides of the chassis 10 and is supported at its rear from the rear axle housing 13 upon any suitable attachment clips 17. At the forward extremity the main frame is mounted on the tractor in any desired manner, such as illustrated in the said co-pending application.

The beets are topped in the ground at the forward portion of the harvester, one row being topped at each side of the chassis 10. The mechanism for topping the beets forms no part of this application, but is described and claimed in full in the said co-pending application.

This application is directed to the means for digging, lifting, gathering, and elevating the topped beets. The topped beets are dug and lifted from the ground by means of conventional lifting plows 18 mounted on the lower extremities of an inverted, U-shaped plow yoke 19.

The plows 18 can be raised and lowered to any desired position through the medium of lifting rods 20 and lifting levers 21. The levers 21 are mounted on a lever shaft 22 which can be rotated by means of an operating lever 78 and a pull rod 23 extending from the power lift of the tractor, or from any actuating device. The shaft 22 is mounted on a tower frame 24 extending upwardly from the rear extremity of the main frame 16.

There are two plow yokes, one for each row of beets, and the mechanism associated with each plow yoke is similar. Each plow yoke 19 is mounted on the forward extremity of a swinging frame 25. The rearward extremity of the swinging frame is hingedly mounted by means of journals 26 upon stub shafts 27 extending into the members of the main frame 16. The forward extremity of each swinging frame is suspended from one of the rods 20 through the medium of a yoke 28. A compression spring 29 surrounds each rod 20 and acts between the yoke 28 and a set collar 30 to allow the forward extremities of the swinging frames to rise over obstructions without affecting the rods 20.

Each swinging frame carries two endless gathering chains 31 positioned above and at each side of the row of beets. The chains are provided with beet gathering lugs or flaps 79.

Each gathering chain extends from an idler sprocket 32 on an idler shaft 33 to a drive sprocket 34 on a drive shaft 35. The shafts 33 and 35 are positioned in substantially vertical, parallel alignment, and the shafts 35 are driven through the medium of V-belts 36 extending to driven pulleys 37 on the shafts 35 from drive pulleys 38 on a counter-shaft 39. The counter-shaft 39 is driven from a chain shaft 40 through the medium of an endless chain 41.

There are, of course, two of the drive pulleys 38 on the shaft 39, one for driving each of the two gathering chains 31. The shaft 40 is mounted on a supporting bracket 42 from a central frame member 11 in the frame 16 and carries a drive sprocket 43 at each of its extremities for driving the endless chains 41 for the two rows.

The shaft 40 is driven from a power chain 44 from a speed-reducing transmission 45, which in turn is driven from a power shaft 46 extending to the power-takeoff 15 of the tractor. The chains 31 are driven in a direction to travel rearwardly at their adjacent sides so that they will engage the opposite sides of the beets, indicated at 47, as they are elevated by the plows 18, so as to carry them rearwardly, crown portion foremost, and completely loosen them from the ground.

The tops or crown portions of the beets are swept rearwardly by means of a spring reel consisting of a plurality of resilient reel arms 48 extending from a reel shaft 49. The reel arms 48 consist of a plurality of spring rods wound at their one extremity about the shaft 49 and extending therethrough, as indicated in Fig. 3, so as to be exceedingly resilient and flexible. The reel arms 48 sweep rearwardly against the loosened beets so as to sweep them into alignment with their larger top portions directed toward the rear of the machine, as indicated in Fig. 4.

The reel shaft 49 is swingably supported between two hinge arms 50 hingedly mounted on the extremities of a rotatable hinge shaft 51 mounted on and extending across the frame 25 adjacent its forward extremity. The hinge arms 50 are suspended from adjustable spring rods 75 surrounded by compression springs 76. The rods 75 support the reel at the most efficient lowermost position, and the springs 76 allow the reel to rise and float over uneven ground and beets of various sizes and heights. The reel shaft 49 is driven from a reel drive chain 52 extending from a driven sprocket 53 on the reel shaft to a drive sprocket 54 on the frame 25. The hinge shaft 51 is driven from the counter-shaft 39 through the medium of a transmission chain 55.

Thus, it can be seen that as the harvester moves forwardly, the topped beets 47 will be engaged by the lifting plows 18 and lifted from the ground. Their upper portions will then be engaged by the reel arms 48 and swept rearwardly, enlarged end foremost, between the chains 31 so that they will lie on their sides in perfect alignment with their root extremities facing forwardly.

The aligned beets are picked up by impaling spikes 56 extending from a plurality of endless spiked chains 57. The spiked chains 57 are vertically trained between lower elevator wheels 58 and upper elevator sprockets 59. The elevator wheels 58 and the sprocket 59 are journalled in vertical floating frames 60 which maintain them in vertical relation with each other and in alignment with the beet rows. As illustrated, there are three spiked chains 57 in a set over each row.

The frames 60 are maintained in vertical movable position by means of parallel links 61 hingedly extending in parallel relation from the upper and lower portions of the frames to the tower frame 24 and the main frame 16. Each floating frame is supported from a pair of supporting levers 62 through the medium of hanging links 63 and link pins 72. The levers 62 are mounted on a lever shaft 64 extending across the entire tower frame 24 so that all of the levers 62 will move simultaneously.

It will be noted that the links 63 are slotted for the reception of the link pins 72 so that the frames 60 rise vertically as the lower wheels 58 pass over uneven ground and over the beets of varying sizes.

The pressure of the wheels 58 is sufficient to crush normal dirt clods and to cause the spikes 56 to penetrate the beets sufficiently to obtain a firm attachment thereto. This pressure is regulated in advance to suit the soil and beet conditions of the field, by means of adjustable suspension springs 73 extending between the tower frame 24 and the floating frames 60, and by means of which a portion of the weight of the spiked chain mechanism is absorbed. The springs are suspended from jack screws 74 for varying the tension in the springs.

The shaft 64 is rotated from the shaft 22 through the medium of an operating lever 77 and a connecting rod 65. Thus, when the pull rod 23 is actuated forwardly and rearwardly, it will simultaneously raise and lower the digging plows 18 and the spiked chains 57.

The upper sprockets 59 are driven through the medium of drive chains 66 from a second counter-shaft 67 mounted on the tower frame 24. The second counter-shaft 67 is driven through the medium of a second endless vertical chain 68 from the transmission 49.

The beets are removed from the spikes of the chains 57 as they pass over the upper wheels by means of stationary rods 69 which extend between the chains. The beets are prevented from falling from the sides of the rods 69 by means of side rods 70. The beets fall from the rods upon an elevating conveyor 71, which carries them to any desired receiving mechanism, such as the hopper illustrated in applicant's co-pending application, Serial No. 677,013 now Patent Number 2,478,877.

Prior attempts to impale and pick up beets have been unsuccessful, first because the beets were not laid in a line so that the impaling spikes would enter the sides of the widest portions of the beets, and, second, because the impaling devices did not float with the proper pressure over the beets. Both of these objections have been overcome by the present applicant, who has had over forty years' experience in raising and harvesting sugar beets. The harvester described and illustrated herein is in successful operation.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A device for picking up dug sugar beets comprising: a supporting frame; means for transporting said frame along a row of dug beets; a tower frame arising from said supporting frame; a vertically movable floating frame positioned within said tower frame; chain wheels journalled at the lower extremity of said floating frame over said row of beets; chain sprockets journalled at the upper extremity of said floating frame over said wheels; endless chains trained between said sprockets and said wheels; spikes protruding from said chains and adapted to impale the beets in the row as said wheels move thereover; means for rotating said sprockets; and a power-driven, resilient reel rotatably suspended from said supporting frame in advance of said chain wheels and acting to contact and sweep the dug beets to a horizontal position with the crown portions of said beets extending rearwardly into alignment with said chains.

2. A device for picking up dug sugar beets comprising: a supporting frame; means for transporting said frame along a row of dug beets; a tower frame arising from said supporting frame; a vertically movable floating frame positioned within said tower frame; chain wheels journalled at the lower extremity of said floating frame over said row of beets; chain sprockets journalled at the upper extremity of said floating frame over said wheels; endless chains trained between said sprockets and said wheels; spikes protruding from said chains and adapted to impale the beets in the row as said wheels move thereover; means for rotating said sprockets; a pair of endless gathering chains positioned in parallel relation in advance of said chain wheels, there being one chain on each side of said row of beets; means for driving the adjacent reaches of said chains rearwardly to engage and swing the beets into alignment with said chains; and a power-driven, resilient reel rotatably suspended from said supporting frame between said gathering chains and acting to contact and sweep the crown portions of said beets rearwardly between said chains.

FRED L. SMITH.

REFERENCES CITED

The following references are of record in the file of this patent:

UNITED STATES PATENTS

| Number | Name | Date |
|---|---|---|
| 809,694 | Jolly | Jan. 9, 1906 |
| 919,342 | Gettelmann | Apr. 27, 1909 |
| 2,172,507 | Grignolo | Sept. 12, 1939 |
| 2,336,623 | Loucks et al. | Dec. 14, 1943 |
| 2,380,701 | Lea et al. | July 31, 1945 |
| 2,437,709 | Rassmann | Mar. 16, 1948 |